United States Patent
Wagner et al.

[15] 3,636,841
[45] Jan. 25, 1972

[54] PHOTOGRAPHIC APPARATUS WITH BUILT-IN EXPOSURE CONTROL ASSEMBLY

[72] Inventors: Karl Wagner, Ottobrunn; Josef Ganser, Munich, both of Germany

[73] Assignee: Agfa-Gevaert Aktiengesellschaft, Leverkusen, Germany

[22] Filed: Jan. 26, 1971

[21] Appl. No.: 109,811

[30] Foreign Application Priority Data

Jan. 30, 1970 Germany.....................P 20 04 259.5

[52] U.S. Cl. ..........................................95/10 CT, 95/53 EB
[51] Int. Cl. .....................G03b 7/04, G03b 7/12, G03b 9/58
[58] Field of Search..............95/10 C, 10 CE, 10 CD, 10 CT, 95/53 E, 53 EA, 53 EB, 64 R, 64 D

[56] References Cited

UNITED STATES PATENTS

| | | |
|---|---|---|
| 3,269,287 | 8/1966 | Ost.......................................95/10 CT |
| 3,299,789 | 1/1967 | Chandler et al........................95/64 D |
| 3,455,219 | 7/1969 | Burgarella...........................95/10 CD |

*Primary Examiner*—Joseph F. Peters, Jr.
*Attorney*—Michael S. Striker

[57] ABSTRACT

A photographic camera wherein the pointer of a moving-coil measuring instrument is scanned by a device which adjusts the diaphragm and/or the shutter when the exposure control assembly of the camera is set for automatic determination of exposure values. When the exposure control assembly is set for the making of exposures with a relatively long exposure time, the instrument is connected with the output of a circuit whose input is then connected with a timer including a photosensitive resistor and a capacitor which is charged by way of the resistor to cause the circuit to move the pointer to an end position when the capacitor is charged to a predetermined value. The user of the camera opens the shutter to thereby complete the circuit and observes the pointer to close the shutter when the pointer is caused to assume its end position. The photosensitive resistor is in circuit with the moving coil of the instrument when the exposure control assembly is set for automatic determination of exposure values.

15 Claims, 2 Drawing Figures

PHOTOGRAPHIC APPARATUS WITH BUILT-IN EXPOSURE CONTROL ASSEMBLY

BACKGROUND OF THE INVENTION

The present invention relates to photographic apparatus with built-in exposure control assemblies, and more particularly to improvements in photographic apparatus with built-in exposure control assemblies utilizing electrical moving-coil measuring instruments. Still more particularly, the invention relates to improvements in photographic apparatus of the type wherein the moving-coil measuring instrument forms part of an exposure control assembly which is capable of automatically determining one or two exposure values (exposure time and aperture size) as a of scene brightness.

SUMMARY OF THE INVENTION

An object of the invention is to provide a photographic apparatus having a built-in exposure control assembly utilizing an electrical moving-coil measuring instrument for automatic determination of one or more exposure values as a function of scene brightness with novel means for indicating to the user the optimum length of relatively long exposure times which are needed when the scene brightness is low, especially when the scene brightness is unsatisfactory for the making of exposures with the camera held by hand.

Another object of the invention is to construct and assemble the automatic exposure control assembly of a photographic apparatus in such a way that its component parts can be used to indicate relatively long exposure times, namely, exposure times which are longer then those determined by the exposure control assembly when the assembly is set for automatic determination of exposure time and/or aperture size in dependency on the intensity of scene light.

The invention is embodied in an exposure control assembly which is built into a photographic apparatus and comprises an electrical moving-coil measuring instrument having a pointer or indicator movable to and from a predetermined position which represents the optimum length of a relatively long exposure time at a low scene brightness, timer means including photosensitive receiver means which is exposed to scene light and capacitor means which can be charged by way of the receiver means at a rate which is a function of scene brightness, a moving circuit having a high-resistance input which is connectable with the timer means and an output which is connectable with the measuring instrument to effect a movement of the indicator to the predetermined position in response to charging of the capacitor means to a predetermined value, switch means which connects the receiver means with the measuring instrument when the exposure control assembly is set for automatic determination of exposure time and/or aperture size and which is actuatable to connect the output of the moving circuit with the measuring instrument, to connect the receiver means with the capacitor means and to connect the timer means with the input of the moving circuit, and adjusting means movable between a first position to thereby set the exposure control assembly for automatic determination of one or both exposure values and a second position to thereby actuate the switch means. The user of the apparatus opens the shutter to thereby connect the parts of the circuitry with an energy source and maintains the shutter in open position until the indicator reaches its predetermined position. Such manual closing of the shutter takes place when the exposure time is relatively long. The shutter is closed automatically when the exposure control assembly is set for automatic operation.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
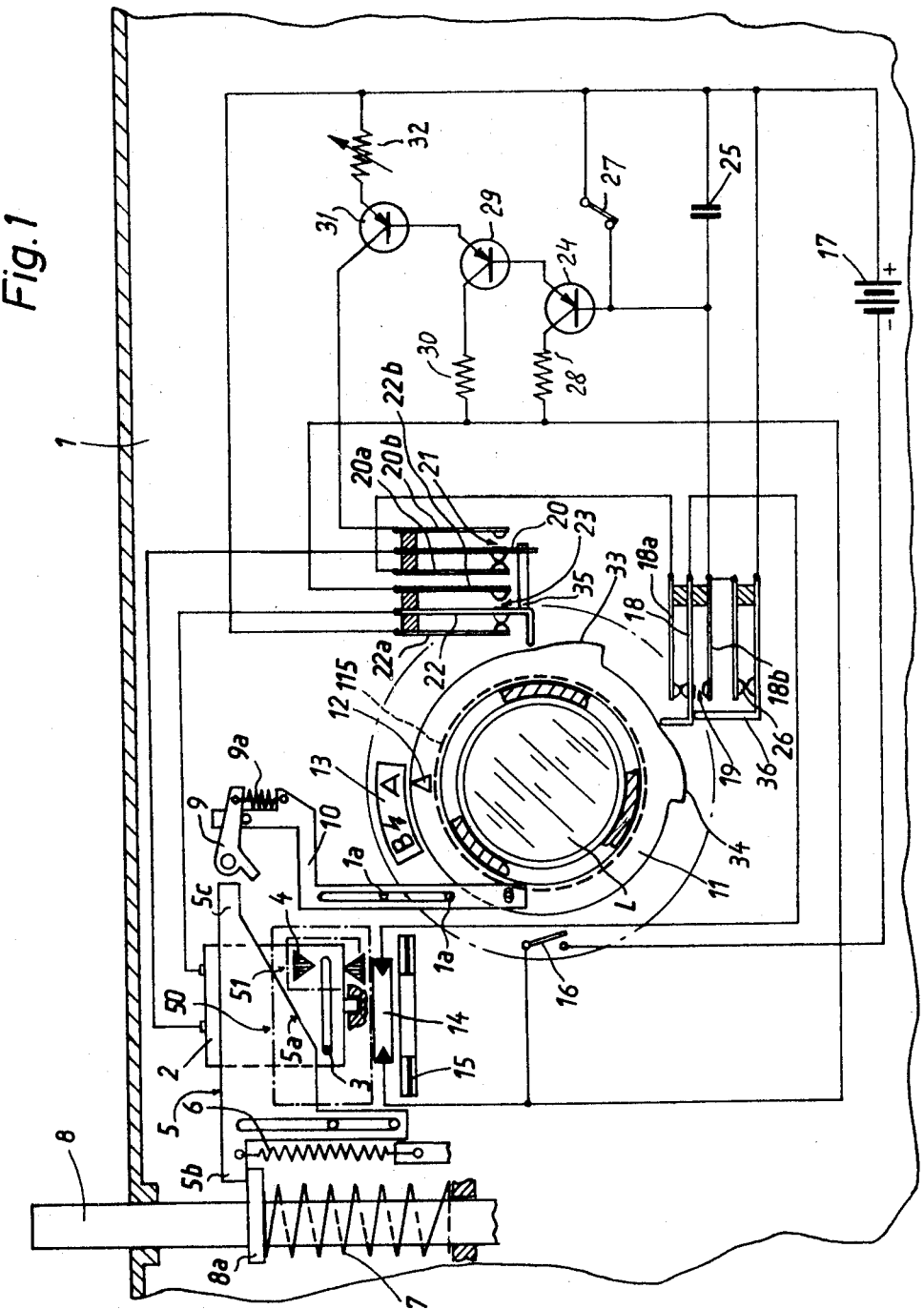
FIG. 1 is a schematic fragmentary sectional view of a still camera having an exposure control assembly which embodies one form of the invention.

FIG. 1 illustrates a portion of a still camera having a housing or body 1 which contains an electrical moving-coil measuring instrument 2 having an indicator or pointer 3 which is movable between a plurality of positions including a predetermined end position indicated by markers 4. A scanning member 5 has an inclined scanning face 5a and is movable up and down, as viewed in FIG. 1, into and out of engagement with the needle 3. The scanning member 5 is biased toward the needle 3 by a relatively weak helical spring 6 and has a projection 5b which normally abuts against a collar 8a provided on a depressible release element 8 which is biased upwardly to the illustrated starting position by a relatively strong helical return spring 7. When no finger pressure is exerted against the exposed upper end portion of the release element 8, the spring 7 overcomes the action of the spring 6 and maintains the scanning member 5 in the upper end position which is shown in the drawing.

A blocking pawl 9 which is pivotably mounted in the housing 1 has a shorter arm moveable into the path of movement of an extension 5c of the scanning member 5 and a longer arm which is coupled to a reciprocable motion transmitting member 10 by a helical spring —9a. The lower end portion of the member 10 is articulately connected to a manually rotatable adjusting ring 11 by a pin-and-slot connection, and the housing 1 has guide pins 1a which confine the member 10 to reciprocatory movement. The adjusting ring 11 is provided with an index 12 which is movable into registry with symbols provided on a fixedly mounted scale 13. These symbols include a character "A" which indicates that the exposure control assembly of the camera is set for automatic operation, a character "B" which indicates that the exposure control assembly is set to make exposures with relatively long exposure times, and a thunderbolt symbol which indicates that the camera is ready to make exposures with artificial illumination of the subject or scene.

A photoelectric receiver here shown as a resistor 14 is mounted in the housing 1 to receive scent light which passes through an auxiliary light-obstructing diaphragm 15. The auxiliary diaphragm 15 is adjustable in response to adjustment of the main diaphragm 11S behind the picture-taking lens L. A switch 16 must be closed in order to connect one terminal of the photoelectric resistor 14 with the negative pole of an energy source 17. The other terminal of the resistor 1—4 is connectable with one terminal of the coil in the measuring instrument 2 by way of a first two-way switch 19 and a second two-way switch 21. The switch 19 —has a median contact 18 which can be moved into engagement with a fixed contact 18a or 18b, and the switch 21 has a median contact 20 which is movable into engagement with a fixed contact 20a or 20b. The other terminal of the coil in the measuring instrument 2 is connectable with the positive pole of the energy source 17 by way of a third two-way switch 23 having a median contact 22 which can engage a fixed contact 22a or 22b.

When the median contact 18 of the two-way switch 19 engages the fixed contact 18b, the one terminal of the photoelectric resistor 14 is connected with the base of a first transistor 24. The resistor 14 is then in series with a capacitor 25 and forms therewith a timer which determines the rate of speed of movement of the pointer 3 into registry with the markers 4. The two-way switch 18 is adjacent to an auxiliary switch 26 which is closed when the contact 18 engages the contact 18a and opens in response to movement of the contact 18 into engagement with the contact 18b. The auxiliary switch 26 is connected in parallel with the capacitor 25. A switch 27 can be closed to short circuit the capacitor 25; the switch 27 opens in automatic response to movement of the shutter (not shown) toward its open position.

The collector circuit of the transistor 24 includes a resistor 28 and the emitter of the transistor 24 is connected with the base of a second transistor 29. The collector circuit of the transistor 29 includes a resistor 30 and the emitter of the transistor 29 is connected with the base of a third transistor 31. The emitter circuit of the transistor 31 includes a variable resistor 32 and the collector of the transistor 31 is connected with the coil of the measuring instrument 2 when the median contact 20 of the switch 21 engages the contact 20b. The left-hand terminal of the coil in the measuring instrument 2 is connected with the negative pole of the energy source 17 in response to engagement of the median contact 22 with the fixed contact 22b when the switch 16 is closed.

The adjusting ring 11 is provided with two cams 33, 34 the first of which serves to move the median contact 22 of the switch 23 into engagement —with the fixed contact 22b when the ring 11 is rotated in a counterclockwise direction from the angular position shown in FIG. 1. The cam 34 can move the median contact 18 of the switch 19 into engagement with the fixed contact 18b to thereby open the auxiliary switch 26 when the adjusting ring 11 is rotated in a counterclockwise direction beyond the angular position shown in FIG. 1. A trip 35 which bears against an extension of the median contact 22 and is secured to the median contact 20 causes the latter to move into engagement with the contact 20b when the contact 22 engages the contact 22b. A similar trip 36 is provided on the lower contact of the auxiliary switch 26 to move this lower contact away from the upper contact when the cam 34 moves the contact 18 into engagement with the contact 18b.

It is to be noted that the cams 33, 34 can be (and normally are) replaced with a single cam having a face which is configurated in such a way that it can engage the contacts 18 and 22 in certain angular positions of the adjusting ring 11.

The pointer 3 of the light meter 2 is observable from without the housing 1, at least at such times when the pointer registers with the markers 4.

The operation:

It is assumed that the index 12 of the adjusting ring 11 registers with the symbol A on the scale 13. The extension 5c of the scanning member 5 is not engaged by the shorter arm of the blocking pawl 9. If the user of the camera wishes to make an exposure, the release element 8 is depressed against the opposition of the return spring 7 whereby the collar 8a moves downwardly and the spring 6 is free to contract so as to move the inclined face 5a of the scanning member 5 into engagement with the pointer 3 whereby the member 5 is arrested in a position which is a function of the angular position of the pointer, i.e., a function of the prevailing scene brightness. As shown in FIG. 1, the coil of the measuring instrument 2 is connected in series with the photosensitive receiver 14 when the index 12 of the adjusting ring 11 registers with the symbol A of the scale 13. The scanning member 5 is operatively connected with and serves to adjust the main diaphragm 115 (and hence the auxiliary light-obstructing diaphragm 15) and/or the shutter as a function of scene brightness, namely, as a function of the angular position of the pointer 3. The transistors 24, 29 and 31 block because the base of the transistor 24 is connected with the positive pole of the energy source 17 by way of the auxiliary switch 26. The release element 8 opens the shutter in response to further depression beyond that position in which the inclined face 5a of the scanning member 5 is permitted to engage the pointer 3, i.e., subsequent to appropriate automatic adjustment of the shutter and/or diaphragm 115 as a function of scene brightness. The extension 5c of the scanning member 5 is free to bypass the shorter arm of the blocking pawl when the index 12 registers with the symbol A on the scale 13.

If the user wishes to make an exposure with a relatively long exposure time, the adjusting ring 11 is rotated by hand so as to place the index 12 into registry with the symbol B of the scale 13. The motion-transmitting member 10 is then moved downwardly, as viewed in FIG. 1, and the spring 9a pivots the blocking pawl 9 so that the left-hand arm of the pawl extends into the path of movement of the extension 5c on the scanning member 5. The release element 8 is thereupon depressed against the opposition of the spring 7 whereby the spring 6 tends to move the scanning member 5 downwardly but such movement of the member 5 is prevented by the left-hand arm of the blocking pawl 9 (i.e., by the adjusting ring 11 through the intermediary of the member 10, spring 9a and pawl 9. Thus, the inclined face 5a of the scanning member 5 cannot reach the pointer 3 of the measuring instrument 2. Furthermore, when the adjusting ring 11 is rotated to move the index 12 into registry with the symbol B, the cams 33 and 34 cause the auxiliary switch 26 to open, the median contact 18 of the switch 19 to engage the contact 18b, the median contact 22 of the switch 23 to engage the contact 22b, and the median contact 20 of the switch 21 to engage the contact 20b. Thus, the photosensitive resistor 14 is connected in series with the capacitor 25 and the coil of the measuring instrument 2 is connected in the output circuit of the transistor 31. The release element 18 also closes the switch 16 and thereupon opens the shutter. The switch 27 is caused to open following opening of the shutter (in a manner not shown in the drawing). Opening of the switch 27 enables the capacitor 25 to become charged by way of the photosensitive resistor 14. During such charging, the potential at the base of the transistor 24 rises so that the transistor 24 begins to conduct whereby the rise of its conductivity depends on the rate at which the capacitor 25 is charged by way of the resistor 14. The current flowing in the collector-emitter circuit of the transistor 24 is amplified by the transistors 29 and 31 so that the strength of the current flowing through the coil of the measuring instrument 2 begins to rise. The angular position of the pointer 3 changes at a speed which depends on the prevailing scene brightness (which is detected by the resistor 14 and determines the rate at which the capacitor 25 is charged). The pointer 3 travels toward the position of registry with the markers 4. The user of the camera terminates the pressure against the head of the release element 8 when the pointer 3 registers with the markers 4 whereby the shutter of the camera is caused to close in a manner not forming part of the present invention. The circuit of the energy source 17 opens automatically in response to closing of the shutter.

In accordance with a modification, the switch 16 can remain in closed position after the release element 8 is permitted to reassume its starting position and the switch 16 opens only in response to renewed depression of the element 8.

The transistors 24, 29, 31 are connected in cascade and together constitute a moving circuit (for the pointer 3) having a high-resistance input connected with the timer including the resistor 14 and capacitor 25 and an output connected with the coil of the instrument 2 when the adjusting ring 11 actuates the switch means 19, 21, 23, 26 in response to movement of its index 12 into registry with the symbol B on the scale 13. The switches 19, 21 are connected in series when the index 12 registers with the symbol A to thereby connect the resistor 14 in series with the coil of the measuring instrument 2. When the index 12 registers with the symbol B, the switch 19 connects the resistor 14 with the capacitor 25 and the switch 21 connects the output of the moving circuit 24, 29, 31 with the measuring instrument 2. The auxiliary switch 26 is then open and the switch 23 connects the measuring instrument 2 with one pole of the energy source 17 (by way of the switch 16). When the index 12 registers with the symbol A, the switch 23 connects the coil of the measuring instrument 2 with the other pole of the energy source 17 and the auxiliary switch 26 is closed.

When the index 12 registers with the symbol B, the low internal resistance of the measuring instrument 2 is transformed into a higher ohmic resistance by the moving circuit 24, 29, 31 so as not to influence the charging of the capacitor 15 in dependency on scene brightness. While the capacitor 25 is being charged, the rising voltage influences the coil of the measuring instrument 2 to move the pointer 3 toward registry with the markers 4.

The reference character 50 denotes a viewfinder which is indicated by phantom lines. The viewfinder 50 has a window 51 which is located in front of the pointer 3 when the latter registers with the markers 4.

The purpose of the blocking pawl 9 is to prevent the scanning member 5 from interfering with movement of the pointer 3 to the position of registry with the markers 4 when the index 12 of the adjusting ring 11 registers with the symbol B.

An important advantage of the improved exposure control assembly is that several parts (14, 19, 21, 23, 26) which are needed for automatic determination of exposure time and/or aperture size can be used for indication of relatively long exposure times.

Figure 2:
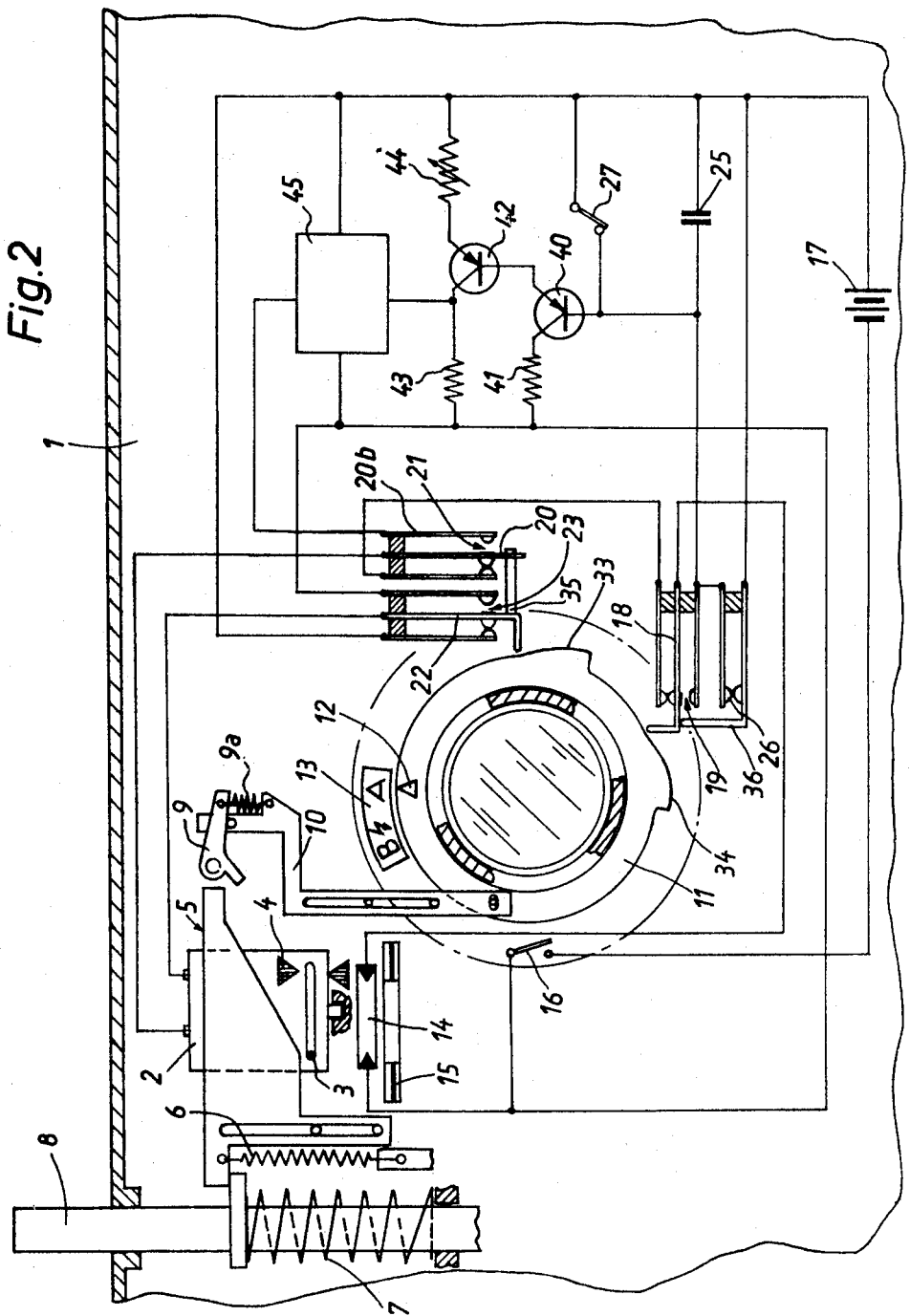
FIG. 2 is a similar view of a camera having a modified exposure control assembly.

Referring to FIG. 2, there is shown a portion of a second still camera wherein all such parts which are identical with or clearly analogous to the corresponding parts of the first camera are denoted by similar reference characters.

The moving circuit of the exposure control assembly shown in FIG. 2 includes a transistor 40 having a collector circuit which includes a resistor 41 and an emitter connected with the base of a second transistor 42. The collector circuit of the transistor 42 includes a resistor 43 and the emitter circuit of the transistor 42 includes a variable resistor 44. The collector of the transistor 42 is further connected with a bistable circuit here shown as a flip-flop 45. The output of the bistable circuit 45 is connectable with the coil of the measuring instrument 2 by way of contacts 20, 20b of the two-way switch 21. The coil of the measuring instrument 2 can be connected with the negative pole of the energy source 17 by way of the switches 16 and 23. The high-resistance input of the moving circuit including the parts 40, 42, 45 is connected with the timer 14, 25 when the index 12 of the adjusting ring 11 registers with the symbol B on the scale 13.

The operation of the camera of FIG. 2 is analogous to that of the first camera. A difference between the two cameras is that the switching circuit 45 abruptly changes its condition after elapse of an interval which is determined by scene brightness (as measured by the photosensitive resistor 14) whereby the circuit 45 causes the pointer 3 to suddenly move to the position of registry with the markers 4. When the index 12 of the adjusting ring 11 registers with the symbol B of the scale 13, the operator terminates the finger pressure upon the release element 8 to close the shutter as soon as the pointer 3 registers with the markers 4.

The moving circuit including the transistors 24, 29, 31 of FIG. 1 or the transistors 40, 42 and the bistable circuit 45 of FIG. 2 can be replaced with other suitable circuits, for example, with a moving circuit including an electronic switching device (such as a unijunction transistor). A moving circuit which employs a unijunction transistor shares the advantages of the circuit shown in FIG. 2, i.e., the pointer 3 is caused to suddenly assume the position of registry with the markers 4 when the capacitor 25 is charged to a predetermined value.

The auxiliary switch 26 insures that the capacitor 25 is charged only when the index 12 of the adjusting ring 11 registers with the symbol B of the scale 13.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, an exposure control assembly comprising an electrical moving-coil measuring instrument having an indicator movable to and from a predetermined position which represents an optimum length of a relatively long exposure time at a low scene brightness; timer means including photosensitive receiver means exposed to scene light and capacitor means chargeable by way of said receiver means at a rate which is a function of scene brightness; a moving circuit having a high-resistance input connectable with said timer means and an output connectable with said instrument to effect a movement of said indicator to said predetermined position in response to charging of said capacitor means to a predetermined value; switch means actuatable to connect said output with said instrument and to connect said input with said timer means; and adjusting means for actuating said switch means at the will of the user.

2. An exposure control assembly as defined in claim 1, wherein said moving circuit comprises a plurality of transistors which are connected in cascade.

3. An exposure control assembly as defined in claim 1, wherein said moving circuit comprises a bistable circuit.

4. An exposure control assembly as defined in claim 1, wherein said moving circuit comprises an electronic switching device.

5. An exposure control assembly as defined in claim 4, wherein said device is a unijunction transistor.

6. An exposure control assembly as defined in claim 1, wherein said adjusting means is movable between a first position in which said switch means connects said receiver means in circuit with said instrument and a second position in which said switch means connects said receiver means with said input and in series with said capacitor means while simultaneously connecting said output with said instrument.

7. An exposure control assembly as defined in claim 6, wherein said switch means comprises two two-way switches each having a first and a second position, said switches assuming said first positions in response to movement of said adjusting means to the first position thereof to thereby connect said receiver means with said instrument, said switches being connected in series in said first positions thereof and being moved to said second positions in response to movement of said adjusting means to its second position whereby one of said switches connects said receiver means with said capacitor means and the other of said switches connects said output with said instrument.

8. An exposure control assembly as defined in claim 7, further comprising a source of electrical energy, said switch means further comprising a third two-way switch movable to a first position in response to movement of said adjusting means to the first position thereof to thereby connect said instrument with one pole of said source and to a second position in response to movement of said adjusting means to the second position thereof to thereby connect said instrument with the other pole of said source.

9. An exposure control assembly as defined in claim 6, wherein said switch means comprises an auxiliary switch connected in parallel with said capacitor means, said auxiliary switch being respectively closed and open in the first and second positions of said adjusting means.

10. An exposure control assembly as defined in claim 1, wherein said adjusting means comprises a manually operated adjusting member.

11. An exposure control assembly as defined in claim 1, further comprising adjustable diaphragm means and adjustable light-obstructing means for changing the exposure of said receiver means to scene light in dependency on the adjustment of said diaphragm means.

12. An exposure control assembly as defined in claim 1, wherein said indicator is a pointer which is observable from without the photographic apparatus, at least in said predetermined position thereof.

13. An exposure control assembly as defined in claim 1, further comprising viewfinder means, said indicator being observable in said viewfinder means at least in said predetermined position thereof.

14. An exposure control assembly as defined in claim 1, further comprising marker means for pinpointing said predetermined position of said indicator.

15. An exposure control assembly as defined in claim 1, wherein said indicator is movable to a plurality of additional positions and further comprising scanning means movable from a starting position into engagement with said indicator and blocking means controlled by said adjusting means and arranged to block the movement of said scanning means into engagement with said indicator when said adjusting means actuates said switch means.

* * * * *